United States Patent [19]
Ahlberg et al.

[11] 3,791,722
[45] Feb. 12, 1974

[54] LENSES

[75] Inventors: Carl S. Ahlberg; John W. Drongeson, both of Minneapolis, Minn.

[73] Assignee: Minnesota Mining and Manufacturing Company, St. Paul, Minn.

[22] Filed: Jan. 12, 1972

[21] Appl. No.: 217,151

[52] U.S. Cl. .......................... 351/45, 2/14 B, 2/14 J
[51] Int. Cl. ............................ G02c 7/16, A61f 9/06
[58] Field of Search ...... 351/44, 45, 47, 48; 2/14 B, 2/14 C, 14 H, 14 W, 14 J

[56] References Cited
UNITED STATES PATENTS

| | | | |
|---|---|---|---|
| 2,230,009 | 1/1941 | Ordorica | 351/45 |
| 3,233,249 | 2/1966 | Baratelli et al. | 351/44 |
| 2,409,356 | 10/1946 | Hutchings | 351/45 |
| 1,067,793 | 7/1913 | Barr | 351/45 |
| 2,824,308 | 2/1958 | Duncan | 351/44 |
| 2,086,293 | 7/1937 | Chevalier | 351/44 |
| 2,796,610 | 6/1957 | Doorenbos | 351/45 |
| 3,524,789 | 8/1970 | Olsen | 161/6 |

FOREIGN PATENTS OR APPLICATIONS

| | | | |
|---|---|---|---|
| 904,372 | 8/1962 | Great Britain | 351/45 |
| 429,340 | 5/1935 | Great Britain | 351/44 |
| 499,740 | 1/1939 | Great Britain | 351/44 |
| 508,388 | 6/1939 | Great Britain | 351/47 |

*Primary Examiner*—Paul A. Sacher
*Attorney, Agent, or Firm*—Kinney, Alexander, Sell, Steldt & Delahunt

[57] ABSTRACT

Lenses are provided having a central sight zone embracing the field of view and at least an upper shading or shielding zone of lower transmittance arcing around the clear central zone so as to provide shading from above and the sides. A further amount of shading may be provided below the clear portion. Shading and lower transmittance are most advantageously provided by louvered film. The lenses are particularly adapted for skiing goggles.

9 Claims, 12 Drawing Figures

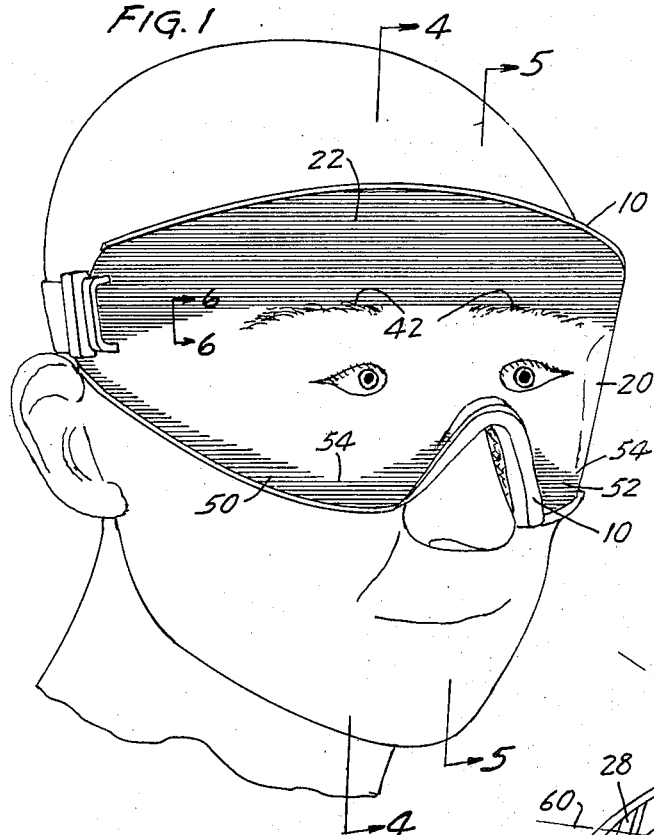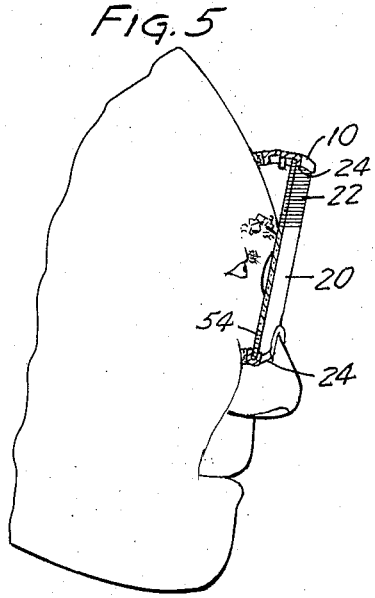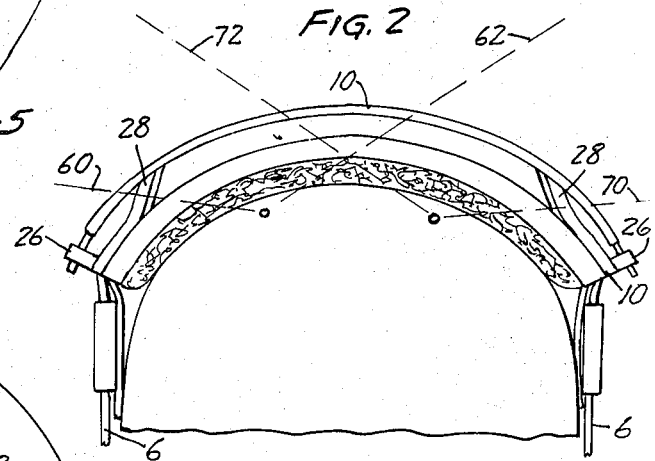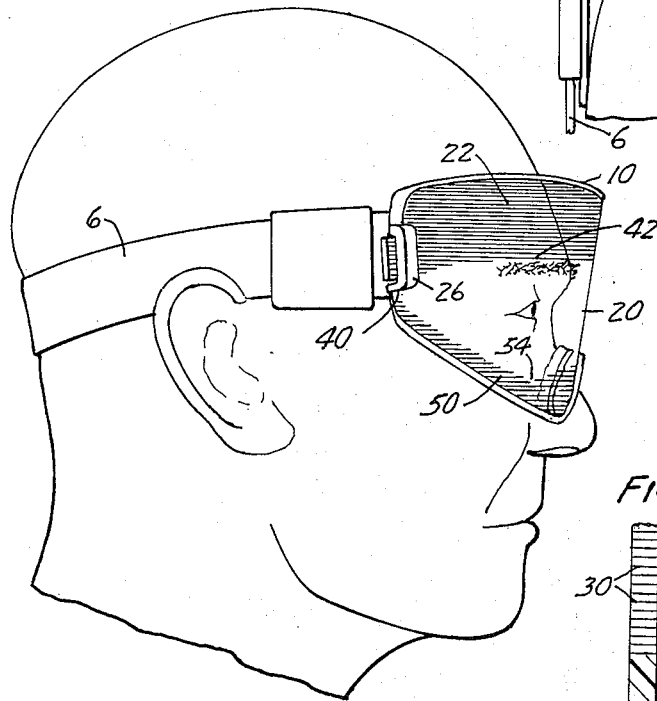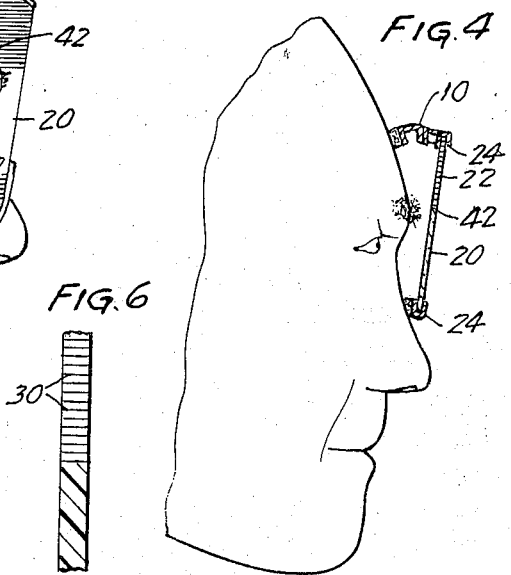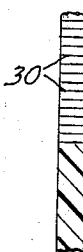

LENSES

This invention relates to lenses which are positioned over the face, suitably in a frame, and are useful in many situations where there is overall brightness as in skiing, motorcycling, snowmobiling and other outdoor sports as well as in various trades where high levels of illumination are encountered.

The use of opaque shields with a narrow open slit for visibility is believed known to arctic inhabitants, but visibility is severly limited. The use of broader zones of transparent material in place of the open slit provides better visibility. Such is most conveniently utilized in conjunction with means for shading the eyes from above and to some extent from below. It is, of course, possible for such shading or shielding to be so effective as to be a hindrance in that one's head must be tilted so as to obtain clear or even partial vision slightly above or below a relatively narrow central zone. On the other hand, such a central transparent zone leaves the eyes open to brilliant light, e.g., sun or glare, from the sides. This may be as disconserting and objectionable as is light from above or below. There is, thus, a need for lenses which provide visibility in directions normally scanned by the eyes yet shade them from light from the sides and above and desirably also from below.

It is a principal aim and object of this invention to provide lenses which provide improved protection of the eyes from extraneous bright light in all directions while permitting a broad amplitude of visibility.

Other aims and objects will become apparent hereinelsewhere.

It has been found that the above principal aim and others are accomplished by providing lenses, which may be adapted to be mounted in frames, and which have a relatively high transmittance or substantially clear sight zone or pane and an upper relatively lower transmittance shading or shielding zone which may be disjunct and in two parts or continuous, the boundary between the shading zone and sight zone being at least laterally upwardly arcuate. In certain preferred embodiments, there are also lower zones of lower transmittance downwardly arcuate from both the nose and the outer corners. The lower zones may also be continuous or disjunct. The embodiments described herein in greater detail and shown particularly in FIGS. 1 – 6 inclusive are intended for positioning at approximately the midpoint of the nose and about 10–25 mm. from the face. Somewhat larger apertures of the sight zone will be desirable for lenses positioned further from the face to avoid interference with normal visual range. In lenses positioned further from the face the disjunction or opening near the nose may not be desired, and concave single lenses may be useful as well as lenses employed in pairs. For attachment to many frames, a flat lens is preferred. It will be noted that the lenses of the invention are generally of sheet construction.

In the preferred embodiments which are more specifically described herein, lower transmittance is provided by louvered films. Louvered films are characterized by including transverse flat members or louvers which may be black or colored in one or more colors. The louvers may be opaque or colored and of reduced transparency. They may be at right angles to the surface of the film or inclined and when inclined, flat lenses of the invention are advantageous in being reversible for different conditions.

At its midpoint, the boundary between the upper shading or shielding zone, also referred to as the arcuate zone, and the sight zone desirably extends approximately as high as a point above the nose and in a line with the upper edge of the frontal eminences of the skull (i.e., approximately on a line with the top of the eye brows) or it may be flat at the top on a line approximately in line with the lower edges of the frontal eminences or the eye brows and between the eyes, and downward on the sides to points approximately on a level with or slightly above or below the lateral canthi and approximately opposite the sphenoid bones (the temples).

The lower zones, when employed, are downwardly arcuate to points approximating the lower edges of each eye socket and then curve smoothly upward toward the center. It may be discontinuous at that point if a space is provided for the nose. The lower zones are then two parts which may be considered a single zone for convenience. This zone should not interfere with vision of a point about 60 cm. in front of the feet when standing erect and glancing down. The curvature of the lower zone runs from points on the sides in a level with or somewhat above or below the lateral canthi. A substantially transparent or unobstructed sight zone or opening which may be tinted or colorless is thus provided in the lens which zone has a generally curved border at the top, although some possible variation in shape will be evident as seen in FIGS. 7 et seq. The lower boundary of the sight zone may be the frame itself or a small zone of lowered transparency, preferably louvered as described for the upper zone, is provided for each eye. The sight zone is constructed so that substantially the entire field of view is entirely unobstructed in vertical planes and, more particularly, in horizontal planes where lateral vision is very valuable in sports but where glare and bright lights can be very objectionable.

Louvered materials for use in lenses of the invention are available particularly from the process of Olsen U.S. Pat. No. 3,524,789, and are commercially available from Minnesota Mining and Manufacturing Company as 3M Brand Display Film. The sight portion of lenses of the invention may be material of the same composition and thickness with or without tinting but without louvers. Cellulose acetate butyrate is an especially satisfactory plastic material for the purpose, but the invention is not limited to particular materials. In general, sheet materials will be of the order of about 0.2 to 2 mm. in thickness with fixed louvers of the order of 0.005 mm. to 0.1 mm. thick constituting about 5 percent up to not more than 20 percent of the surface of the louvered material. As noted above, the louvers may be colored and one or both surfaces of the louvered material may be overlain by transparent sheets which are colorless or tinted.

The louvered material may include louvers substantially at right angles to the surface or the louvers may be inclined from the horizontal by a few degrees, for example, up to about 30°, to permit of some transparency at an angle. This same effect can be achieved by bowing or curving the lens itself. It will be seen that a flat lens comprising inclined louvers can be reversed with respect to the line of sight for different or even greater shading effect if desired. In such a lens a somewhat narrower clear portion may be useful as acuity of vision at a considerable vertical angle may not be required. This effect is, of course, not possible if a zone of continuous lower transmittance, for example, deeply tinted but without louvers, is employed.

It is contemplated that the sight portion, by which is meant the portion without embedded louvers, may be colorless and essentially water white and clear or it may be tinted in various shades such as pink, yellow, smokey, green, blue, orange or violet. Because of the efficiency with which the upper shading or shielding zone of lower transmittance in lenses of the invention shades the eyes, it is found that tinting of the sight portion is not always necessary although some people may find it helpful and it may be useful under exceptional light conditions.

Lenses of the invention may be made to fit any type of frame and can even be made without a separate frame if desired. The lenses may be as a single unit with or without an opening for the nose, or may be in pairs in spectacle-like glasses. All that is needed is some means or provision for positioning the lens with the sight portion in front of the eyes and extending laterally sufficiently to avoid substantial reduction of lateral vision. This lateral extension is here referred to by the term wraparound. Ordinary heavy eye glass frames, for example, often tend to block vision at the corners.

Lenses of the invention are further described by references to the figures attached hereto. It will be recognized that the precise configuration of the frame and means provided in the lens for attachment to the frame are not critical to the invention and do not even form a part of the broad invention which is a lens having shading or shielding portion and a sight portion and a positioning means adapted for positioning the lens so that the field of vision is included within the sight portion of the lens.

In the Figures:

FIG. 1 is a three quarter view of goggles useful for skiing employing a lens of the invention in a schematic frame on a schematic face.

FIG. 2 is a view from above of the goggles of FIG. 1.

FIG. 3 is a view from the right side of the goggles of FIG. 1.

FIG. 4 is a sectional view of the goggles of FIG. 1 along line 4—4 passing approximately opposite the pupil of the eye, the face being retained intact.

FIG. 5 is a sectional view of the goggles of FIG. 1 along line 5—5 approximately at the center of the face opposite the bridge of the nose, the face being retained intact.

FIG. 6 is a much enlarged cross-section along line 6—6 of a portion of the lens of the gogles of FIG. 1 showing the louvers of the shading or shielding upper zone.

Figure 7:
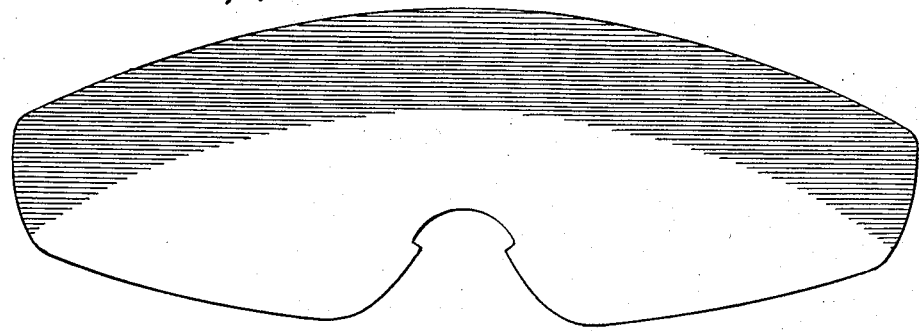
FIGS. 7 to 10 are views of lenses of the invention in flat form showing various configurations of shading and sight portions of the lenses as well as a pair of lenses (FIG. 10) and a single large curved double lens shown in front in FIG. 11 and on the side in FIG. 12.

In the drawings, frame 10 is positioned against the face and retained by head band 6. The structures of frame 10 and head band 6 are immaterial to the invention inasmuch as they may be modified in many ways. For example, the lens 20 may be secured in or to the frame by dogs, cleats, grooves, channels, screws, pins or other means. In the drawings, lens 20 is shown fitted into channels 24 at least partially along outer edges of the frame at top and at the bottom and over the nose.

Figure 8:
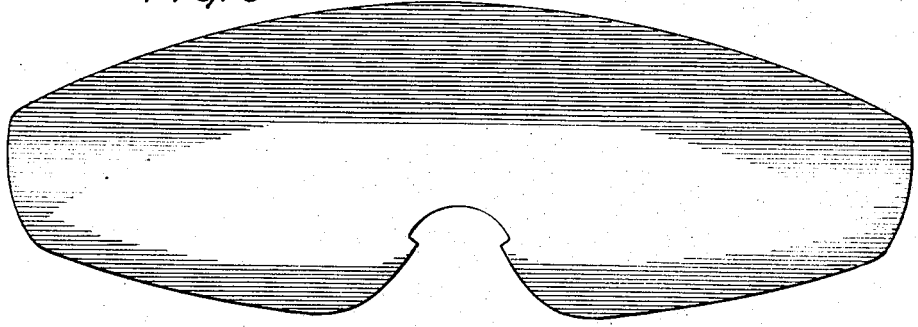
Figure 9:
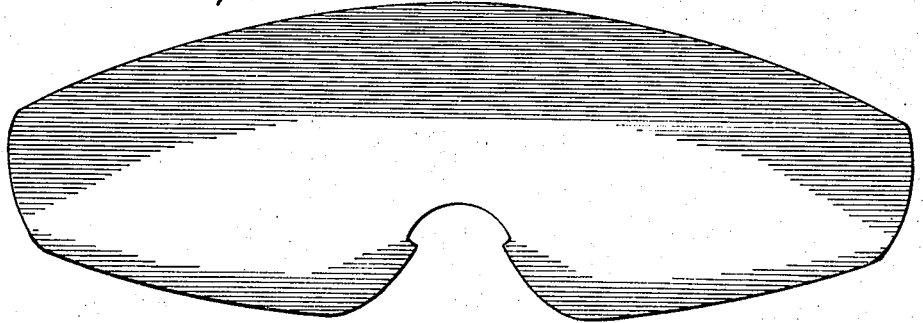
Figure 10:
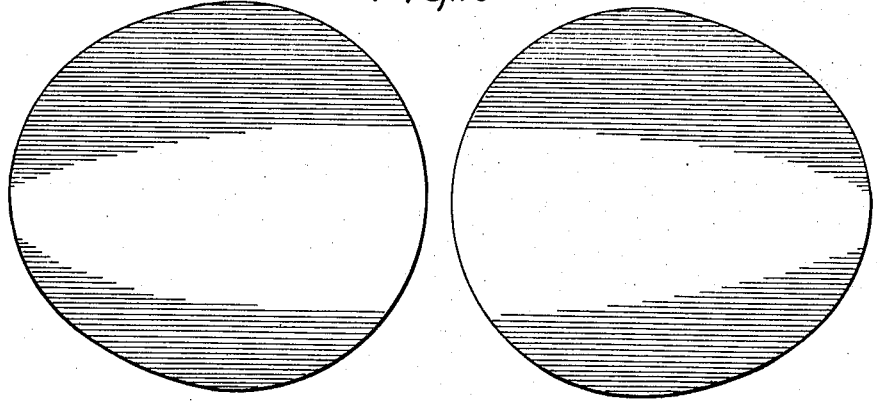
Figure 11:
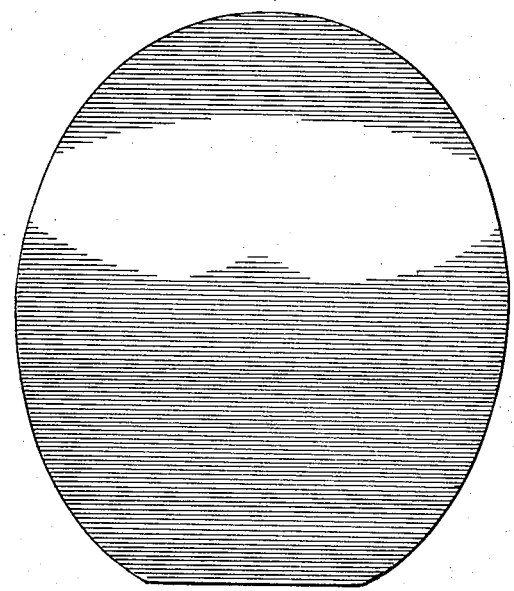
Figure 12:
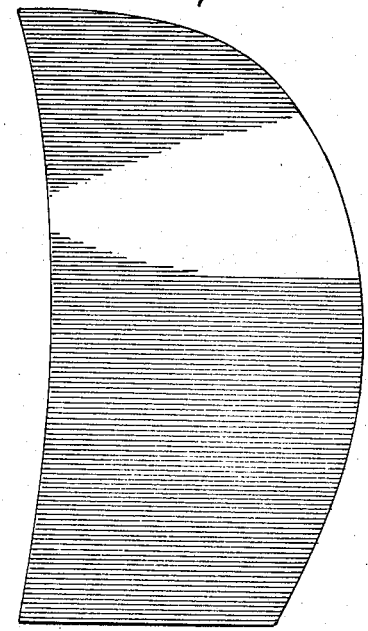

The lenses of FIGS. 7 through 12 may also be fitted into suitable channels in frames. The outer ends of lens 20 are shown engaging with suitable slotted portions 26 of the frame which may also be provided with ventilation ports indicated somewhat schematically at 28.

Referring particularly to the lens 20 which embodies the present invention it will be seen that there is an upper zone 22 shown with horizontal lines to indicate the structure of embedded louvers 30 shown in FIG. 6. This zone characteristically is upwardly arcuate on a curve extending from points 40 about opposite the sphenoid bone (the temple) or on a level with the lateral canthus to a point 42 above the pupil of the eye about opposite or on a level with the eyebrows as shown. One side only is shown but it will be recognized that this structure is symmetrical. Between the pupils of the eyes the zone may continue on arcs from both sides meeting in the middle over the nose or the points may be connected by a straight line as shown between points 42 and 42 in FIG. 1. The line may even dip slightly. It is contemplated that other variations in this upper zone may be adopted for esthetic purposes provided only that the angle of vision of the eyes be not substantially impaired. It will be evident that upper zone 22 is related to features of the head so that it provides shading from light over an extensive angle without interfering with vision. Ski goggles incorporating lenses of the invention may be adjusted for personal comfort, seeking conformity of bone structure and frame, over a considerable range without negating the shading benefits of the lens. As the shading upper zone is lowered toward the eye, it develops a degree of transparency such that it does not affect vision as a completely opaque shield would, although retaining its excellent shielding from bright lights such as the sun. As noted hereinelsewhere, the embedded louvers may be inclined so that the lens provides different effects when reversed.

Referring again to the Figures, it will be evident that in this embodiment of the invention, there are also lower shading or shielding zones 50 and 52 which may also be considered as a single zone broken at the nose. The drawings show right hand zone 50 but left hand zone 52 is alike but in mirror-image relationship. These zones likewise are preferably constructed with embedded louvers as seen in the section of FIG. 4 so that they curve downward from about the same side points 40 as the upper zone and curve downward to points 54 opposite and below the pupils of the eye and then upward toward the nose. The lower shielding zones are not necessary in the invention although forming part of the preferred embodiment. They are not permitted to interfere with the field of vision. In skiing, for example, they should permit ready visibility of the points of skis by glancing down without inclining the head.

In FIGS. 2, 4 and 5, rays are shown to indicate angles of vision permitted by the lens of the invention. These may be slightly greater than actually useful angles of vision. The rays are designated 60 and 62 for the left eye in FIG. 2 and 70 and 72 for the right eye in that figure. It will be recognized that the rays in FIG. 5 are also directed toward the left and correspond approximately to the angle of ray 72 of FIG. 2. Rays in FIG. 4 indicate the approximate maximum vertical angles of vision without head movement. It will be evident that moving the lens further from the face will require either enlarging the sight area to retain identical angles or may interfere with the full angle of vision. However, the characteristics of the sheet louvered material are such that interference at margins of the field of vision is not especially objectionable in actual practice. The selection of lenses suitable for specific purposes and situations will be within the skill of the art from the present disclosure. Colored louvered materials may be employed to achieve interesting esthetic effects while retaining the many advantages of shielding of the eyes exhibited by lenses of the invention. It is also contemplated that louvered materials may include patterns, such as colored stripes or insets of devices such as stars or other symbols.

What is claimed is:

1. A lens comprising an upper generally arcuate zone of lower transmittance composed of louvered sheet material and a sight zone encompassing the angle of vision said lens adapted for engagement in a wrap-around frame having an upper louvered zone extending upward from a curve extending between points near the ends approximately opposite the temples and passing above the eyes at points approximately opposite the eyebrows or frontal eminences.

2. A lens according to claim 1 wherein the upper louvered zone is bounded by a straight line between points approximately above the eyes.

3. A lens according to claim 1 having a concave shape.

4. A lens according to claim 1 having a planar configuration and being reversibly engagible in the frame.

5. A lens according to claim 1 in which the louvered zones are in colors.

6. A lens according to claim 1 additionally including louvered shielding extending from the lateral lower points of the upper louvered zone below each eye.

7. A lens according to claim 6 having a planar configuration and being reversibly engagible to the frame.

8. A lens according to claim 7 wherein the louvers are colored.

9. A lens according to claim 1 in combination with second lens having a mirror image relationship thereto and together providing sight zones substantially embracing the entire normal field of vision.

* * * * *